J. B. Sweetland,
Churns
No. 61,892. Patented Feb. 5, 1867.
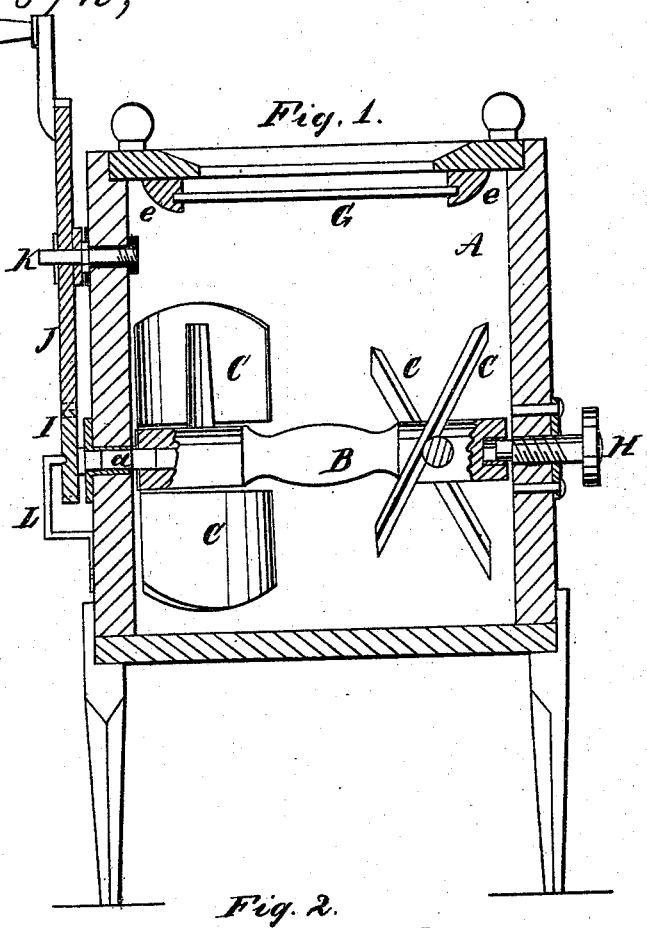
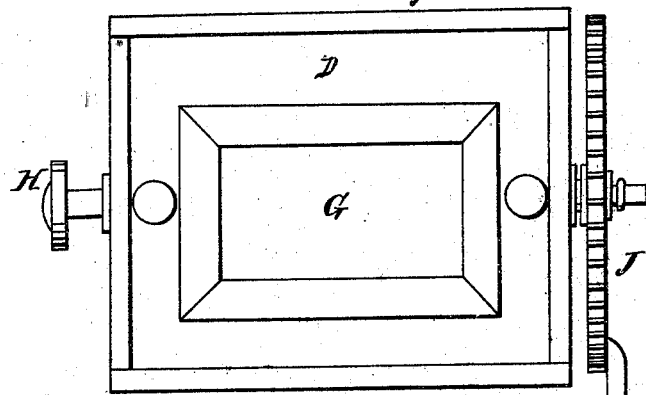
Witnesses.
A. A. Yeatman
F. Lehmann
Inventor
J. B. Sweetland
per Alexander Mason

United States Patent Office.

J. B. SWEETLAND, OF PONTIAC, MICHIGAN.

Letters Patent No. 61,892, dated February 5, 1867.

IMPROVEMENT IN CHURNS.

The Schedule referred to in these Letters Patent and making part of the same.

TO ALL WHOM IT MAY CONCERN:

Be it known that I, J. B. SWEETLAND, of Pontiac, in the county of Oakland, and State of Michigan, have invented certain new and useful Improvements in Churns; and I do hereby declare that the following is a full, clear, and exact description of the same, reference being had to the accompanying drawings and to the letters of reference marked thereon.

In the annexed drawings, making part of this specification, A represents the body of the churn, which is a square box with a concave bottom. The bottom is either formed of staves or slats, or is made of one piece of wood curved in the proper manner. The body A is supported upon four legs. B represents a shaft which passes through the churn-box from its two ends; this shaft is provided with two sets of wings or dashers, C C, which are placed or secured upon the shaft at such an angle that, when the shaft is rotated in the direction it is intended to move, they force the cream or milk toward each other. The wings are placed near the ends of the box, and so adjusted that their ends as they revolve will scrape the cream from the ends of the box. The shaft B is confined in position in the churn-box by means of a screw, H, at one end, and a short shaft, $a$, at the other, both of which pass through the ends of the box and into the ends of the said shaft. The shaft $a$ is provided on its outer end with a pinion, I, into which gears a toothed wheel, J. The wheel J is secured upon a short axle, K, which passes into the end of the box, as shown. L represents a spring bent as shown, and pivoted at one end to the end of the box; the other end fits into a little recess in the outer face of the pinion I, and serves to keep the pinion in its place. By springing out this spring L and swinging it out of the way, the pinion may be removed. By taking out the screw H, the shaft B may then be removed from the box. D represents the cover of the box or body A. This cover fits down into the mouth of the box. A square or oblong opening is cut through the centre of the top; and on the under side of said top two bars or cleats are nailed or secured. These cleats or bars are marked $e$ $e$, and are provided with grooves, into which grooves a pane of glass or door, G, is slipped. The glass G is about a quarter or half an inch below the cover D, and projects about three-eighths of an inch beyond the sides of the opening cut in the cover D. The object of this arrangement is to allow of ventilation or a free circulation of air through the churn-box, without danger of the cream or milk splashing out. It will be seen that the construction of the dasher-shaft and its supports is such that said dasher can be easily removed for gathering the butter or for cleansing the churn, or any other desirable purpose.

Having thus fully described my invention, what I claim as new, and desire to secure by Letters Patent, is—

The cover D, provided with the ventilating door G, dropped below the opening cut through said cover, whereby a free circulation of air is had to and from the churn-box, around the sides of the door, used in combination with the churn-box, dasher-shaft, screw H, shaft $a$, pinion I, and spring L; the whole being arranged in the manner substantially as specified.

As evidence that I claim the foregoing, I have hereunto set my hand, in the presence of two witnesses.

J. B. SWEETLAND.

Witnesses:
   JUNIUS TEN EYCK,
   EDWARD R. THORPE.